United States Patent
Mariman et al.

(10) Patent No.: US 8,910,582 B2
(45) Date of Patent: Dec. 16, 2014

(54) ROW UNIT FOR A SEEDING MACHINE HAVING ACTIVE DOWNFORCE CONTROL FOR THE CLOSING WHEELS

(75) Inventors: Nathan Albert Mariman, Geneseo, IL (US); Paul Reed Riewerts, Port Byron, IL (US); Elijah B. Garner, Bettendorf, IA (US); Lee E. Zumdome, Bettendorf, IA (US)

(73) Assignee: Deere & Company, Moline, IL (US)

( * ) Notice: Subject to any disclaimer, the term of this patent is extended or adjusted under 35 U.S.C. 154(b) by 661 days.

(21) Appl. No.: 13/083,789

(22) Filed: Apr. 11, 2011

(65) Prior Publication Data

US 2012/0255475 A1  Oct. 11, 2012

(51) Int. Cl.
*A01C 5/00* (2006.01)
*A01C 5/06* (2006.01)
*A01C 7/20* (2006.01)

(52) U.S. Cl.
CPC .................. *A01C 7/205* (2013.01); *A01C 5/066* (2013.01)
USPC ............................. 111/192; 111/190; 172/4

(58) Field of Classification Search
USPC ............. 111/190–196, 200, 149, 163; 172/4, 172/500, 452
See application file for complete search history.

(56) References Cited

U.S. PATENT DOCUMENTS

| | | | | |
|---|---|---|---|---|
| 5,375,542 A | * | 12/1994 | Schaffert | 111/192 |
| 5,479,992 A | | 1/1996 | Bassett | |
| 5,497,837 A | * | 3/1996 | Kehrney | 172/619 |
| 6,389,999 B1 | | 5/2002 | Duello | |
| 6,701,857 B1 | | 3/2004 | Jensen et al. | |
| 7,401,561 B1 | * | 7/2008 | Kurz | 111/62 |
| 7,673,570 B1 | | 3/2010 | Bassett | |
| 7,870,826 B2 | | 1/2011 | Bourgault et al. | |
| 2010/0010667 A1 | | 1/2010 | Sauder et al. | |
| 2010/0198529 A1 | | 8/2010 | Sauder et al. | |
| 2011/0313572 A1 | | 12/2011 | Kowalchuk et al. | |
| 2012/0048159 A1 | | 3/2012 | Adams et al. | |

FOREIGN PATENT DOCUMENTS

| | | |
|---|---|---|
| CA | 2549371 | 11/2007 |
| CA | 2581613 | 9/2008 |
| EP | 0140263 | 5/1985 |
| EP | 0372901 | 2/1994 |
| WO | 20080086283 | 7/2008 |

OTHER PUBLICATIONS

European Search Report, Jul. 27, 2012 (6 pages).

* cited by examiner

*Primary Examiner* — Alicia Torres

(57) ABSTRACT

A planter row unit is disclosed having an active downforce control system for the closing wheels. This separate control of the downforce pressure for the closing wheels is provided from the row unit downforce control. A single operator input is used to set a desired downforce for all row units. The control system then operates to produce the desired downforce. Alternatively, the control system may display a downforce load to the operator who then manually makes adjustments as desired.

8 Claims, 4 Drawing Sheets

ROW UNIT FOR A SEEDING MACHINE HAVING ACTIVE DOWNFORCE CONTROL FOR THE CLOSING WHEELS

FIELD

This disclosure relates to seeding machines and in particular to an active downforce control system for the closing wheels of a seeding machine row unit.

BACKGROUND AND SUMMARY

It is known in the seeding art to provide active control of downforce on a row unit of a seeding machine such as a planter to ensure the furrow opener is operating at a proper depth and to control the downforce to provide only as much downforce as is needed. This reduces unnecessary soil compaction adjacent the seed furrow. However, the proper downforce for the opener does not always provide the proper downforce on the closing wheels. An adjustable spring is typically provided between the closing wheels and the row unit frame. This can be set by the operator before, operation and if needed, the operator can stop planting and readjust the closing wheels downforce springs. However, operators seldom will take the time to adjust the closing wheel downforce springs during planting.

A row unit is disclosed having an downforce control system for the closing wheels. The closing wheel downforce control may be active, that is closed loop, or inactive, that is open loop. This control of the downforce pressure for the closing wheels can be separate from the row unit downforce control or can be related to the row unit downforce control by making the closing wheel downforce proportional to the row unit downforce. In a closed loop control, operator input to the control system is used to set a desired downforce for the closing wheels. The control system then operates the downforce actuator to produce the desired downforce. In an open loop control, a monitor displays a load to the operator who then commands operation of the downforce actuator to change the downforce on the closing wheels as desired.

DESCRIPTION

Figure 1:
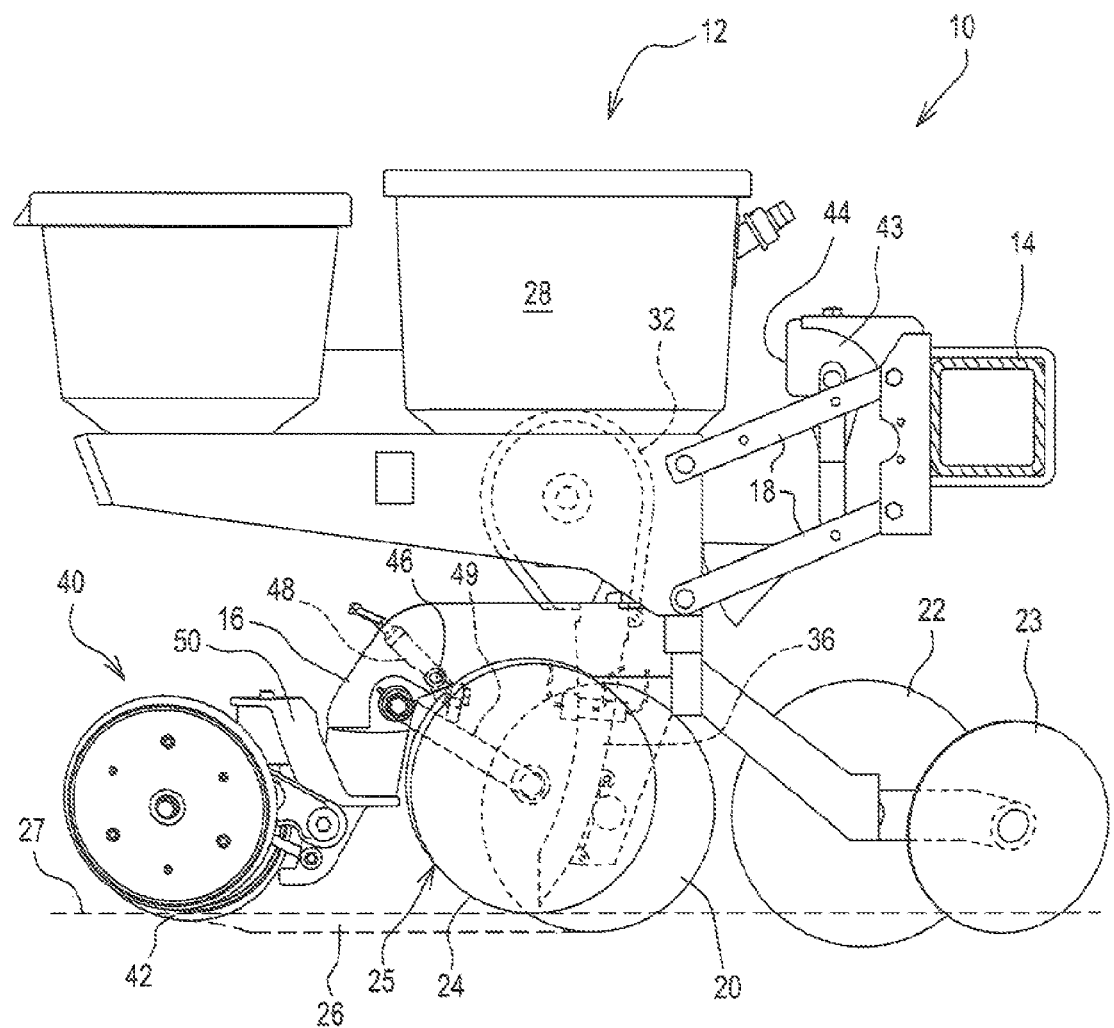
FIG. 1 is a perspective view of a row unit of a seeding machine.

Referring now to the drawings, and more particularly to FIG. 1, there is shown a portion of a seeding machine 10. As shown, seeding machine 10 is in the form of a row crop planter but may also be other forms of machines. FIG. 1 illustrates a single row unit 12 of a multi-row planter, with each row crop unit 12 being substantially identical and connected to a machine frame 14 shown as a tool bar. Only a single row crop unit 12 is shown and described below for sake of simplicity. Row crop unit 12 includes a multi-part row unit frame 16 which is attached to tool bar by parallel linkage 18.

The tool bar is coupled to a traction unit (not shown), such as an agricultural tractor. For example, tool bar may be coupled to an agricultural tractor using a draw bar or 3-point hitch assembly. The tool bar may be coupled with transport wheel assemblies, marker arms, etc. which may be of conventional design and not shown for clarity.

Frame 16 carries a double disc furrow opener 20 for forming a seed furrow 26 in soil 27. An optional coulter wheel 22 and row cleaner 23, particularly for use in no till situations, may be placed ahead of double disc furrow opener 20. A pair of furrow depth regulating members 25 in the form of gauge wheels 24 are respectively associated with the pair of discs of double disc furrow opener 20. More particularly, each gauge wheel 24 is positioned generally in line with and immediately adjacent to the outside of each respective disc of double disc furrow opener 20. The gauge wheels 24 may be vertically adjusted to change the depth of the furrow which is cut into the soil using double disc furrow opener 20.

A seed meter 32 is also carried by frame 16. Seed meter receives seed from a seed hopper 28 carried above the seed meter on the frame 16. The seed meter drive is not shown. Seed meter 32 delivers seed sequentially to a seed tube 36 through which the seed falls by gravity to the furrow 26, or other delivery device. A furrow closing arrangement follows behind the gauge wheels with a pair of closing wheels 42 positioned generally in line with double disc furrow opener 20. Closing wheels 42 are preferably biased in a downward direction and have a peripheral edge with a shape which may vary, depending upon the application. Closing wheels 42 push soil back into the furrow 26 upon the seeds deposited therein. Closing wheels 42 serve as a ground contacting member.

The row unit 12 is equipped with a row unit downforce actuator 43 in the form of an adjustable pneumatic downforce cylinder 44. The row unit downforce actuator 43 acts between the machine frame 14 and the lower links of the linkage 18 to apply downforce on the row unit to ensure there is a desired force of the gauge wheels 24 acting on the soil. This ensures that the double disc furrow opener 20 is forming the furrow 26 to the desired depth. The amount of the downforce on the row unit, and thus the force of the soil on the gauge wheels 24, is measured by a load sensor in the pivot pin 46 in the gauge wheel depth adjustment link 48. A suitable load sensing pin is shown in WO2008/086283 A2. Load sensors can be placed in a variety of locations on the gauge wheel support arm 49 or adjustment link 48. As described more fully below, a controller receives a signal from the load sensor in the pin 46 and controls the pressure in the cylinder 44 accordingly to achieve a desired downforce on the gauge wheels.

Figure 2:
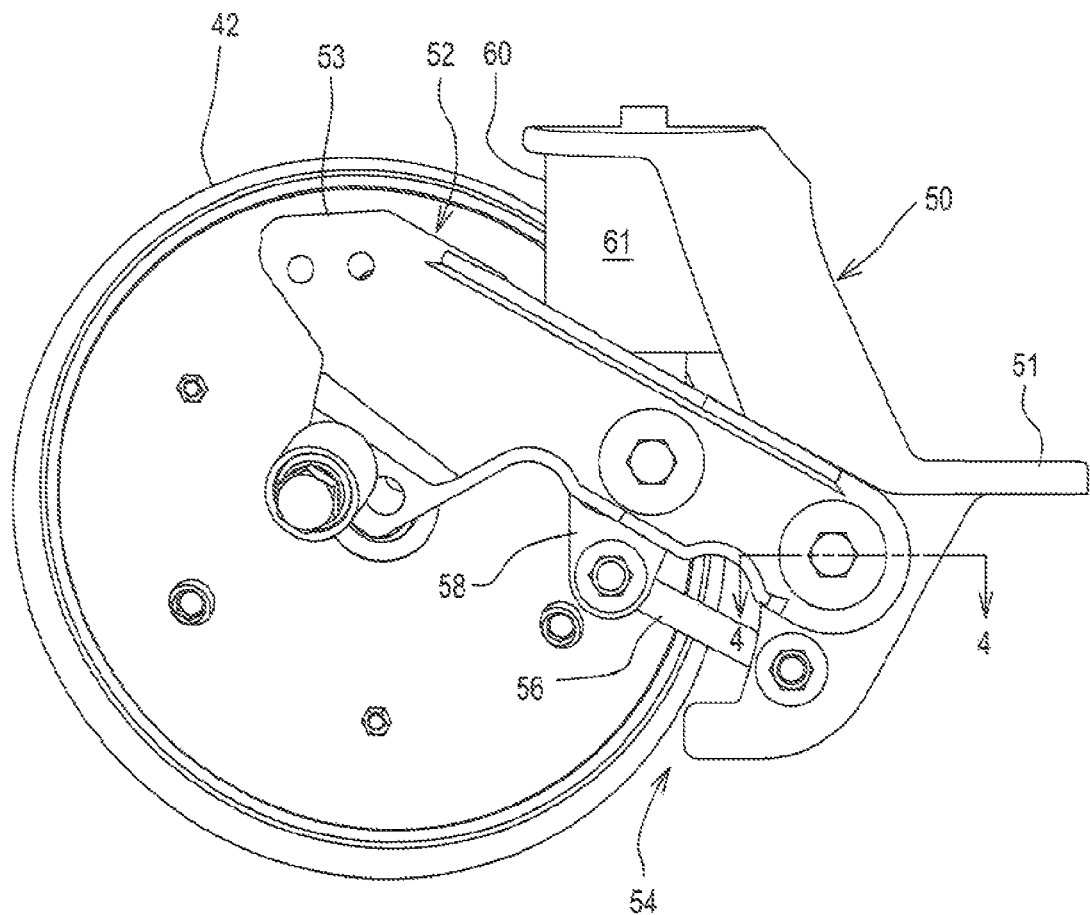
FIG. 2 is a side view of the closing wheel arrangement of the row unit of FIG. 1 with one closing wheel removed to illustrate the arrangement.

To ensure proper closing of the seed furrow 26, the furrow closing arrangement 40 provides for controlled downforce on the closing wheels. The control can be dynamic, that is changing the downforce during operation of the machine, either automatically (closed loop) or manually (open loop). Furrow closing arrangement 40 includes a mounting frame 50 (FIGS. 2-4) attached to the row unit frame 16 at the rear thereof. Shelf 51 of the mounting frame 50 is used to attach the mounting frame to the row unit frame 16. While the mounting frame 50 is a separate piece, once attached to the frame 16, it functions as part of the row unit frame 16. The mounting frame 50 is a separate piece to enable other closing options to be installed in the row unit but could be integrated into the frame 16 if desired. A pivot arm 52 is rotatably coupled to the row unit frame, via the mounting frame 50. The closing wheels 42 are mounted to the pivot arm 52. The pivot arm 52 serves as a first link in a parallelogram linkage 54. Linkage 54 includes a second link 56 and a coupler 58 connected to the first link, i.e. pivot arm 52, and to the second link 56. A pneumatic cylinder 60 is connected between the mounting frame 50 and the coupler 58 and serves as a furrow closing downforce actuator 61. When pressure in the cylinder 60 is increased, the closing wheels 42 exert a greater force on the soil to close the furrow 26.

Figure 3:
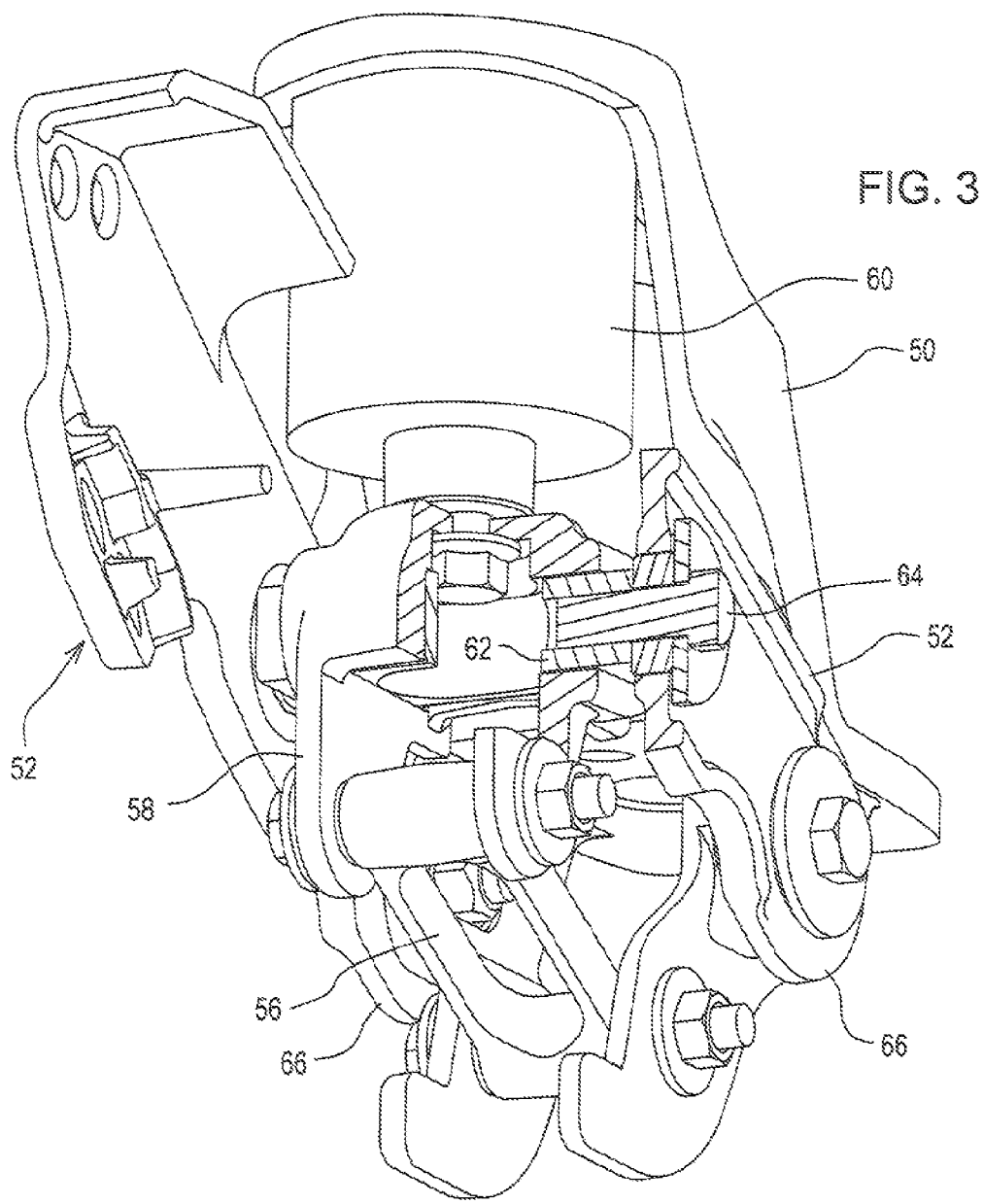
FIG. 3 is a bottom perspective view partial sectional view of the closing wheel arrangement.
Figure 4:
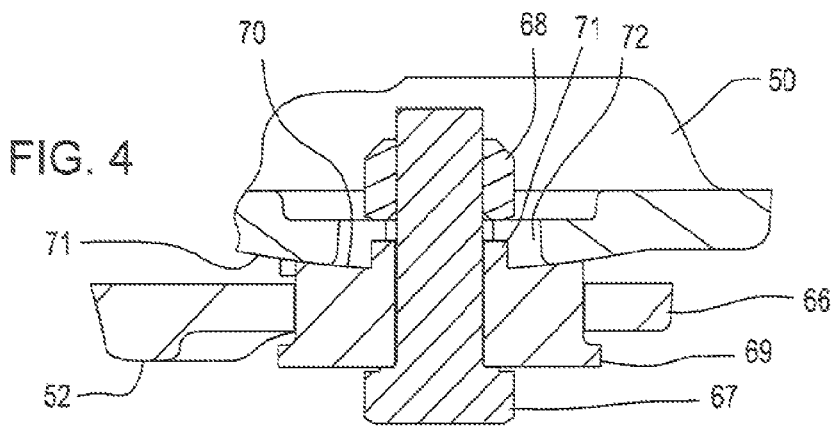
FIG. 4 is a sectional view along the line 4-4 of FIG. 2.

As shown in FIG. 3 a slide member 62 connects the coupler 58 to the pivot arm 52. This allows for a limited degree of lateral movement of the pivot arm 52 while the cylinder 60 and coupler 58 remain fixed laterally. The coupler 58 only moves in a vertical direction. FIG. 4 is a sectional view through the attachment of the pivot arm 52 to the mounting frame 50. The attachment of each leg 66 is symmetrical. Bolt 67 and nut 68 attach the leg to the mounting frame using a bushing 69. The leg 66 does not directly contact the mounting frame 50. Instead, the bushing 69 engages the mounting frame 50. The bushing surface 70 is curved and complementary to the curved surface 71 of the mounting frame. The bolt 67 extends through a fore and aft extending slot 72 in the mounting frame. The slot and the curved surfaces 70 and 71 allow the pivot arm 52 to be adjusted about a vertical axis to adjust the side-to-side location of the closing wheels 42 to ensure they are center over the furrow 26. The bushing 69 has a projection 73 that is seated into the slot 72 to orient the bushing properly for mating of the surfaces 70 and 71. The slide member 62 allows the pivot arm to be adjusted without affecting the location of the lower end of the cylinder 60.

The bolt 64 that connects the slide member 62 to the pivot arm 52 can be a load sensing pin having a load sensor similar to the pin 46 mentioned above. The sensor measures the load acting on the soil from the closing wheels. The bolt 64 is only one position of many that may be suitable for a load sensor to measure the load on the closing wheels. Any of the pivot pins in the closing wheel arrangement may be used to measure the load. Alternatively, a load cell may be attached to or integrated into the pivot arm or other links in the closing wheel arrangement.

Figure 5:
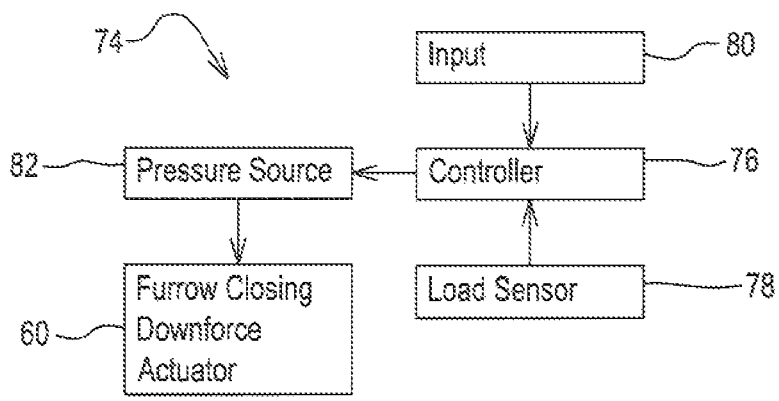
FIGS. 5, 6 and 7 are schematic diagrams of different embodiments of the downforce control system for the seeding machine.

A control system 74 is shown schematically in FIG. 5. A controller 76 receives a load signal from a load sensor 78 such as the bolt 64. An input device 80 enables a machine operator to input a desired downforce into the controller. The controller in turn generates a signal for an air pressure source 82, causing the pressure to increase or decrease. The air pressure is then directed to the actuator, or pneumatic cylinder 60. It will be readily appreciated that the pressure source 82 could be a fixed, that is constant, pressure source and the controller connected to a regulating valve between the pressure source and the cylinder 60. As used herein, reference to the controller being operably connected to an actuator to vary the load applied to the soil is meant to mean the controller is connected to a pressure source or pressure control valve for pressure operated actuators or to an electrical control for an electric actuator. Any connection that enables the controller to operate the actuator is intended to be included.

Figure 6:
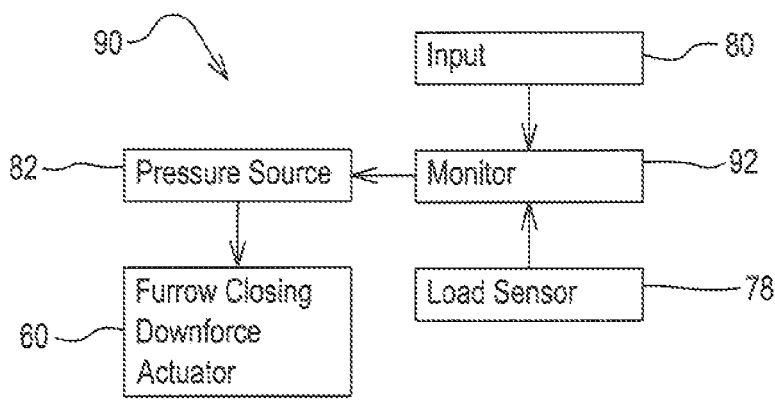

An open loop control system 90 is shown in FIG. 6, where like components from control system 74 are given the same reference numeral. In control system 90, the controller is replace with a monitor 92. The monitor 92 receives the output signal from the load sensor 78 and displays the load to an operator. The operator then uses the input device 80 to control the pressure to operate the furrow closing downforce actuator 60. As shown, the input device operates through the monitor 92. Alternatively, the operator input can be directly to the pressure source 82 or a pressure regulating valve, etc.

The control system is capable of dynamic (closed loop control) or open loop control to vary the downforce on the closing wheels with varying field conditions as the seeding machine moves through a field. Alternatively, the control system can be used to initially set the air pressure in the cylinder and then not change the pressure during operation. In such a case, the load sensor 78 is not needed. Such a system would provide an advantage over a mechanical closing downforce system in that a single input to the controller or manual valve adjustment can adjust the closing wheel downforce on all or multiple row units without the need to manually adjust springs on each row unit individually. One load sensor 78, on one row unit 12, can be used as the feedback input to control the pressure in the cylinders 60 of multiple row units on the seeding machine. In other words, a load sensor is not needed for every row unit 12. Perhaps one load sensor for each section of the seeding machine frame is sufficient.

Figure 7:
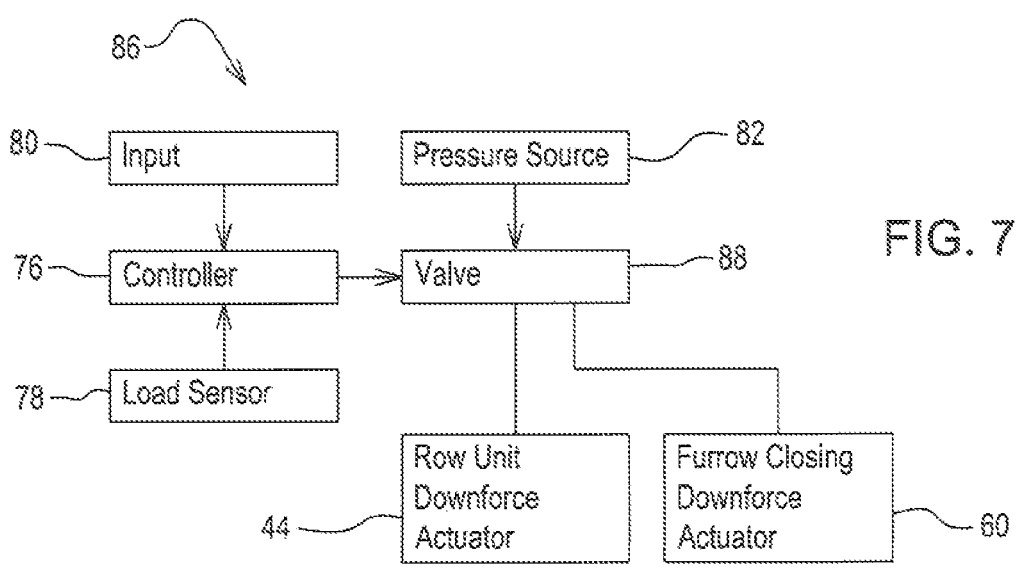

Another control system 86 is shown in FIG. 7 with components common between the control system 74 and control system 86 given the same reference numeral and not described again. Control system 86 uses one load sensor for measuring the downforce on the row unit. The load measured by the one sensor 78 is used in the control of both the row unit downforce and the closing wheel downforce. Alternatively, two or more load sensors can may be used in control system 86, one measuring the load on the furrow depth regulating member and another measuring the load on the closing wheel. Control system 86 has valve 88 connected to the pressure source 82 and supplies pressure to both the cylinder 60 for the closing wheel downforce actuator and the cylinder 44 for the row unit downforce. Valve 82 controls the pressure independently to the two actuators 44, 60, that is each actuator can be supplied with a different pressure. Thus a single control system is used to control both the row unit downforce and the closing wheel downforce. Valve 88 could be two separate valves if desired. Having two separate actuators for the row unit downforce and the furrow closing wheel downforce with independent control of the pressure to the two actuators, allows maximum flexibility to the operator in the control of row unit and closing downforce. Alternatively, a pressure regulator could be used to link and/or adjust forces between the two systems in an open-loop or closed-loop manner. Multiple cylinders 60 and 44 from multiple row units can be controlled with one controller 76 or manual adjustment.

In its simplest form, the closing wheel downforce arrangement includes an actuator operable to vary the downforce on the closing wheels as the machine moves through a field and an operator accessible switch or control to activate the actuator to vary the downforce. A load sensor and a monitor for the operator to see the measured load are optional.

While the closing wheel downforce arrangement is disclosed and described in the context of a pneumatic cylinder used as the actuator, other actuators can be used such as a hydraulic, electronic or electro-mechanical, etc. The type of actuator is not critical. By providing control of the closing wheel downforce, the machine operator is better able to assure the seed furrow is properly closed. A pressure based actuator, pneumatic or hydraulic allows for more constant downforce across a range of loads compared to a mechanical system.

While a pair of closing wheels 42 have been shown, it will be appreciated that any of a variety of ground contacting members can be used in place of the closing wheels 42. Alternatives include a packing wheel, a single closing wheel, a tine type closing device or any combination thereof, etc. Additional attachments can be mounted at the rear end 53 of the pivot arm 52.

Having described the seeding machine, it will become apparent that various modifications can be made within the scope of the accompanying claims.

What is claimed is:

1. A row unit for a seeding machine comprising:

a row unit frame adapted to be mounted to a machine frame;

a furrow opener and a furrow depth regulating member both mounted to the row unit frame; and a furrow closing arrangement movably mounted to the row unit frame, the furrow closing arrangement having a four bar linkage with a pivot arm forming a first link of the linkage, the linkage further having a second link, the first and second links being pivotally connected to the row unit frame at a first pair of pivot axes, and a coupler connecting the first and second links at a second pair of pivot axes whereby the row unit frame and the coupler form third and fourth links of the four bar linkage, the furrow closing arrangement further having a ground contacting member mounting to a portion of the pivot arm extending beyond the second pair of pivot axes, and a furrow closing downforce actuator coupled between the row unit frame and the coupler and operable to vary force applied to soil by the ground contacting member as the seeding machine moves through a field.

2. The row unit of claim 1 further comprising a control system including a load sensor adapted to detect a load applied by the ground contacting member to the soil, and a controller receiving a signal from the load sensor, wherein the controller is operably connected to the furrow closing downforce actuator to vary the load applied by the ground contacting member to the soil.

3. The row unit of claim 2 wherein the controller is adapted to dynamically operate the furrow closing downforce actuator to vary the load applied by the ground contacting member to the soil.

4. The row unit of claim 1 further comprising a control system including a load sensor adapted to detect a load applied to the soil, a monitor receiving a signal from the load sensor and displaying the load to an operator and an operator input to operate the furrow closing downforce actuator to vary the load applied by the ground contacting member to the soil.

5. The row unit of claim 1 wherein the furrow closing downforce actuator is one of a pneumatic cylinder, hydraulic cylinder, and electro-mechanical actuator.

6. The row unit of claim 1 further comprising a second linkage mounting the row unit frame to the machine frame, a row unit downforce actuator operable to vary downforce on the row unit and a control system including at least one load sensor adapted to detect a load applied to the soil, and a controller receiving a signal from the load sensor wherein the controller is operably connected to both the row unit downforce actuator and the furrow closing downforce actuator to vary the load applied to the soil by the depth regulating member and the ground contacting member.

7. The row unit of claim 6 wherein the control system comprises two load sensors with one sensor adapted to detect the load applied to the soil by the furrow depth regulating member and a second load sensor adapted to detect the load applied to the soil by the ground contacting member.

8. The row unit of claim 1 wherein the connection between the coupler and the pivot arm permits lateral adjustment of the pivot arm relative to the coupler.

* * * * *